United States Patent [19]

Ooumi et al.

[11] Patent Number: 4,945,515

[45] Date of Patent: Jul. 31, 1990

[54] MEMORY WRITING APPARATUS

[75] Inventors: Manabu Ooumi; Toshihiko Sakuhara; Tatsuaki Ataka, all of Tokyo, Japan

[73] Assignee: Seiko Instruments, Inc., Chiba, Japan

[21] Appl. No.: 243,512

[22] Filed: Sep. 12, 1988

[30] Foreign Application Priority Data

| Sep. 10, 1987 | [JP] | Japan | 62-227366 |
| Sep. 29, 1987 | [JP] | Japan | 62-245334 |
| Sep. 29, 1987 | [JP] | Japan | 62-245335 |
| Oct. 7, 1987 | [JP] | Japan | 62-253157 |

[51] Int. Cl.$^5$ ............................ G11C 7/00; G11B 9/00
[52] U.S. Cl. ..................................... 365/174; 369/126
[58] Field of Search ................ 365/174, 244; 369/132, 369/126

[56] References Cited

U.S. PATENT DOCUMENTS

| 4,575,822 | 3/1986 | Quate | 365/174 |
| 4,826,732 | 5/1989 | Kazan et al. | 369/126 X |
| 4,829,507 | 5/1989 | Kazan et al. | 369/126 |

Primary Examiner—Joseph A. Popek
Attorney, Agent, or Firm—Spensley Horn Jubas & Lubitz

[57] ABSTRACT

An input section comprising a needle which has a fine tip portion. A data is written in a memory by applying electrical stimulation between the tip portion of the needle and the memory. A memory writing apparatus enables non-contact recording on an atomic or molecular scale.

11 Claims, 8 Drawing Sheets

MEMORY WRITING APPARATUS

BACKGROUND OF THE INVENTION

The present invention relates to a memory writing apparatus.

Conventional memory writing apparatuses employ various recording methods In magnetic recording method, a memory section formed by coating a carrier with a magnetic powder such as acicular $Co\text{-}\gamma Fe_2O_3$ is generally employed and magnetized longitudinally within its plane or magnetized perpendicular to the plane of the memory section (i.e., perpendicular magnetization recording method). Another type of prior art apparatus employs an opto-magnetic recording method wherein the plane of a magnetic film has previously been magnetized in a predetermined direction and a laser beam is then applied to a position on the film where recording is to be effected to raise the temperature at said position, thereby inverting the direction of magnetization.

The conventional apparatuses that employ the above-described methods suffer, however, from the following problems. Since a part of the writing apparatus is in physical contact with the memory section, the memory section cannot stand use for a long period of time. Further, since a unit memory section is defined by a region comprising a number of atoms more than a certain value, achievement of higher density is restricted.

SUMMARY OF THE INVENTION

It is the primary object of the present invention to provide a memory writing apparatus by which the above-mentioned defect of the conventional technique is overcome and an improved memory writing apparatus which enables non-contact recording on an atomic or molecular scale.

In accordance with the present invention, there is provided a memory writing apparatus comprising an input section which comprises at least one needle having a fine tip portion, and control means for controlling the input section, whereby high-density recording is achieved. The control means comprises means for positioning the tip portion of the needle close to a surface of a memory, means for scanning the tip portion of the needle over the surface of the memory and means for controlling a distance between the tip portion of the needle and the surface of the memory during scanning. In the memory writing device, writing is carried out by applying an electrical stimulation between the tip portion of the needle and the memory.

DESCRIPTION OF THE PREFERRED EMBODIMENTS

According to the present invention, a memory writing apparatus comprises an input section which comprises at least one needle having a fine tip portion, and control means for controlling the input section. The control means comprises means for bringing the tip portion of the needle to close to the surface of a memory to thereby effect positioning, means for allowing the tip portion of the needle to scan the surface of the memory and means for controlling the distance between the tip portion of the needle and the surface of the memory during scanning. The needle has a fine tip portion so that a tunnel current flows between the tip portion and the memory surface. The tip portion may be made of electrically conductive material or semiconductive material.

The present invention will now be described in detail with reference to the following.

Embodiment 1

Figure 1:
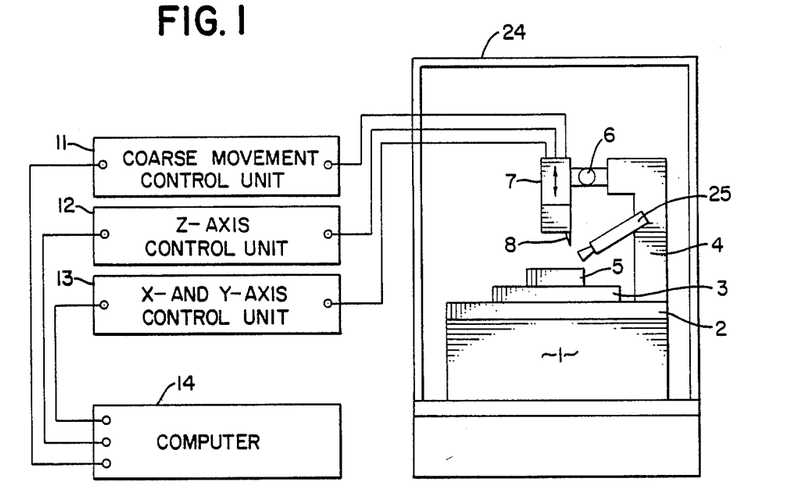
FIG. 1 schematically shows an memory writing apparatus according to the present invention.

FIG. 1 shows a memory writing apparatus according to the present invention. A needle actuating unit 7 is secured to an arm 4 which is rigidly secured to a surface plate 2 mounted on an antivibration mount 1. The needle actuating section 7 can be moved vertically by turning a dial 6 and therefore can be used to effect coarse positioning of the memory section 5 and a needle 8 in the Z-axis direction. Coarse positioning in the in-plane directions (X-Y axes) is controlled by means of an X-Y stage 3 and a coarse control unit 11. An optical microscope 25 can be used in coarse alignment of the needle 8 and the memory section 5. Scanning in the in-plane directions is effected by controlling a three-dimensional piezo-electric device incorporated in the needle actuating unit 7 by the operation of an X-and Y-axes control unit 13. A predetermined voltage within a range of from 1 to 100 mV is applied between the memory section 5 and the needle 8 to thereby effect writing on the memory 5.

The coarse control unit 11, Z-axis control unit 12 and X-and Y-axes control unit 13 are controlled by a computer 14. The whole apparatus except for the power supply, the control units 11 to 13 and the computer 14 is installed within a shielding box 24.

In the apparatus, the X-Y stage 3, supporting the memory 5 coarse movement control unit 11 and optical microscope 25 are comprised of the positioning means for positioning the tip portion of the needle 8 close to a surface of the memory 5. The scanning means for scanning the tip portion of the needle over the surface of the memory comprises the X-and Y-axes control unit 13. The distance controlling means for controlling a distance between the tip portion of the needle and the surface of the memory while the tip portion of the needle scans thereover comprises the coarse movement control unit 11 and Z-axis control unit 12.

Embodiment 2

In this embodiment, the apparatus of the embodiment 1 is used and a dielectric is used as the memory 5. The needle 8 is brought close to one atom of the dielectric which is on the surface of the memory 5 to apply a voltage and thereby polarize it. Then, the needle 8 is moved in the X- or Y-axis direction on the X-Y plane to apply a voltage to an atom at that position so as to polarize it in the same manner as the above. In this way, memory writing on an atomic scale is realized.

Embodiment 3

In this embodiment, the apparatus of the embodiment 1 is used and a compound having a polarity is used as the memory 5. If a polar compound is present on the surface of the memory 5, application of a voltage causes a molecule of the compound to rotate along the direction of the electric field. Then, the needle 8 is moved in the X- or Y-axis direction on the X-Y plane and a voltage is similarly applied thereto, thereby rotating a polar compound molecule at that position. Thus, memory writing on a molecular scale is realized.

Embodiment 4

In this embodiment, the apparatus of the embodiment 1 is used and a liquid crystal compound is used as the memory 5. When a voltage is applied to a liquid crystal, the direction of its molecules changes The needle 8 is brought close to one molecule of the liquid crystal compound constituting the memory 5 and a voltage is applied to the needle 8 to thereby change the direction of the molecule. Then, the needle 8 is moved in the X- or Y-axis direction on the X-Y plane and a voltage is similarly applied thereto, thereby changing the direction of a liquid crystal molecule at that position. Thus, memory writing on a molecular scale is realized.

Embodiment 5

In this embodiment, the apparatus of the embodiment 1 is used and an electrically conductive needle is employed as the needle 8. In addition, an element which has some valencies is used as the memory 5. When a voltage is applied to an atom of an element which has some valencies, the number of electrons thereof changes. The electrically conductive needle 8 is brought close to one atom of the element, which has some valencies, constituting the memory 5 and a voltage is applied thereto to thereby cause a tunnel effect, thus changing the number of electrons of the atom. Then, the needle 8 is moved in the X- or Y-axis direction on the X-Y plane and a voltage is similarly applied thereto, thereby causing a tunnel effect and thus changing the number of electrons of the atom at that position. In this way, memory writing on an atomic scale is realized.

Embodiment 6

In this embodiment, the apparatus of the embodiment 1 is used and an electro chromic material is used as the memory 5. When a voltage is applied to a molecule of an electro chromic material, the wavelength of absorbance thereof changes. The needle 8 is brought close to one molecule of such a material and a voltage is applied thereto, thereby causing a tunnel effect and thus effecting writing on the memory. Then, the needle 8 is moved in the X- or Y-axis direction on the X-Y plane and a voltage is similarly applied thereto, thereby causing a tunnel effect and thus changing the wavelength of absorbance of the molecule at that position. In this way, memory writing on a molecular scale is realized.

Embodiment 7

In this embodiment, the apparatus of the embodiment 1 is used and a polar compound immersed in a polar solvent is used as the memory 5. In addition, an electrically conductive needle is employed as the needle 8. At the surface of the memory 5 comprising a polar compound placed in a polar solvent, the polar compound is ionized. Accordingly, the surface of the memory 5 may be considered to be weakly electrified. If a tunnel effect is caused by bringing the electrically conductive needle 8 close to each molecule of the polar compound, the electric charge is removed. Thus, memory writing on a molecular scale is realized.

Embodiment 8

In this embodiment, a multiplicity of needles each having a minutely shaped tip portion are employed, and these needles are actuated independently of each other to thereby effect memory writing.

Figure 2:
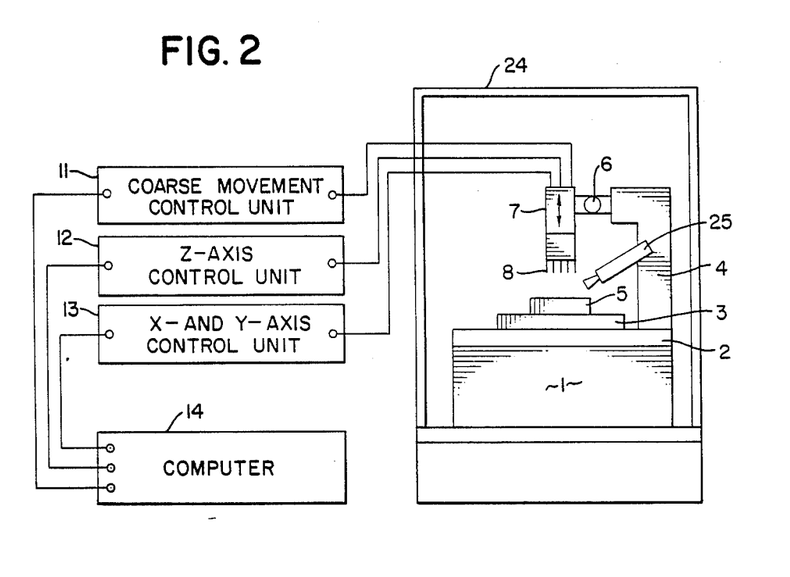
FIG. 2 schematiccally shows a memory writing apparatus according to the embodiment 8.

FIG. 2 shows a memory writing apparatus according to this embodiment. A needle actuating section 7 is secured to an arm 4 which is rigidly secured to a surface plate 2 mounted on an antivibration mount 1. The needle actuating section 7 can be moved vertically by turning a dial 6 and therefore can be used to effect coarse positioning of the memory 5 and needles 8 in the Z-axis direction. Coarse positioning in the in-plane directions (X-Y axes) is controlled by means of an X-Y stage 3 and a coarse control section 11. An optical microscope 25 can be used in coarse alignment of the needles 8 and the memory section 5. Scanning in the in-plane directions is effected by controlling a three-dimensional piezo-electric device incorporated in the needle actuating section 7 by the operation of an X-and Y-axes control section 13. The needles 8 can be moved in the Z-axis direction independently of each other by the operation of the needle actuating section 7.

A predetermined voltage within a range of from 1 to 100 mV is applied between the memory 5 and the needles 8 to thereby effect writing on the memory section 5. The coarse control section 11, Z-axis control section 12 and X-and Y-axes control section 13 are controlled by a computer 14. The whole apparatus except for the power supply, control sections 11 to 13 and computer 14 is installed within a shielding box 24.

Embodiment 9

Figure 3:
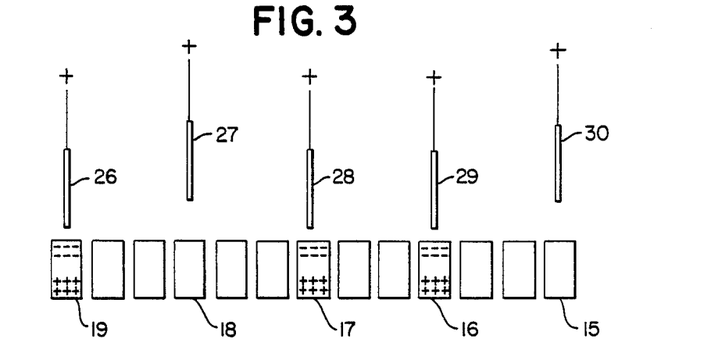
FIGS. 3 to 7 are enlarged views each showing a part of the arrangement including the tips and memory section according to each of the embodiments 9 to 13.

In this embodiment, the apparatus of the embodiment 8 is used and a dielectric is employed as the memory 5. FIG. 3 is an enlarged view of a part of the arrangement including the needles 8 and the memory 5 according to this embodiment. Needles (26 to 30) are brought close to dielectric atoms (15 to 19) which are present on the surface of the memory 5 to apply a voltage and thereby polarize them. The atoms (18 and 15) under the respective needles (27 and 30) which are not brought close thereto are not polarized. Then, the needles are moved in the X- or Y-axis direction on the X-Y plane and only the needles which are above the positions that need writing are brought close to the dielectric atoms concerned in the same manner as the above, thereby polarizing only the atoms at said positions. In this way, memory writing on an atomic scale is realized.

Embodiment 10

Figure 4:
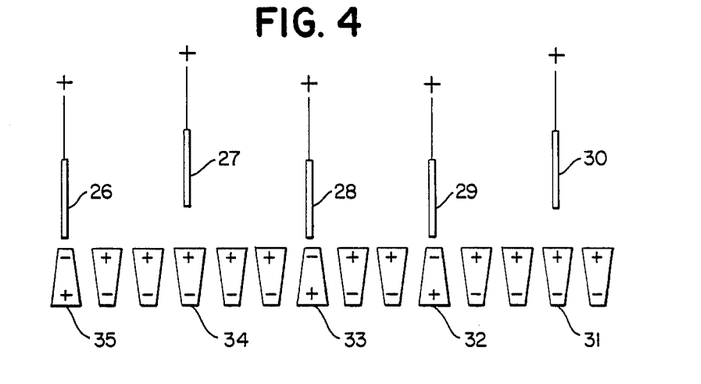

In this embodiment, the apparatus of the embodiment 8 is used and a compound having a polarity is employed as the memory 5. FIG. 4 is an enlarged view of a part of the arrangement including the needles 8 and the memory 5 according to this embodiment. When a voltage is applied to molecules (31 to 35) of the polar compound constituting the memory 5, the molecules rotate along the direction of the electric field. The molecules (34 and 31) under the respective needles (27 and 30) which are not brought close thereto do not rotate. Then, the needles are moved in the X- or Y-axis direction on the X-Y plane and only the needles which are above the positions that need writing are brought close to the polar compound molecules concerned in the same manner as the above, thereby rotating only the molecules at said positions. In this way, memory writing on a molecular scale is realized.

Embodiment 11

Figure 5:
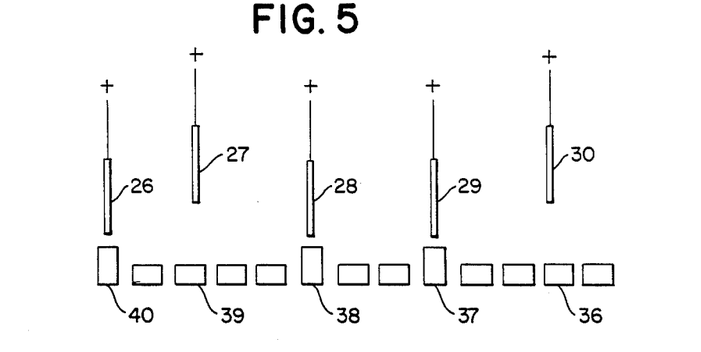

In this embodiment, the apparatus of the embodiment 8 is used and a liquid crystal compound is employed as the memory 5. FIG. 5 is an enlarged view of a part of the arrangement including the needles 8 and the memory 5 according to this embodiment. When a voltage is applied to a liquid crystal, the direction of its molecules changes. Needles (26 to 30) are brought close to molecules (36 to 40), respectively, of the liquid crystal compound constituting the memory 5 and a voltage is applied thereto to thereby change the direction of the liquid crystal molecules The molecules (39 and 36) under the respective tips (27 and 30) which are not brought close thereto do not change their direction. Then, the needles are moved in the X- or Y-axis direction on the X-Y plane and only the tips which are above the positions that need writing are brought close to the liquid crystal molecules concerned in the same manner as the above, thereby changing the direction of only the molecules at said positions. In this way, memory writing on a molecular scale is realized.

Embodiment 12

Figure 6:
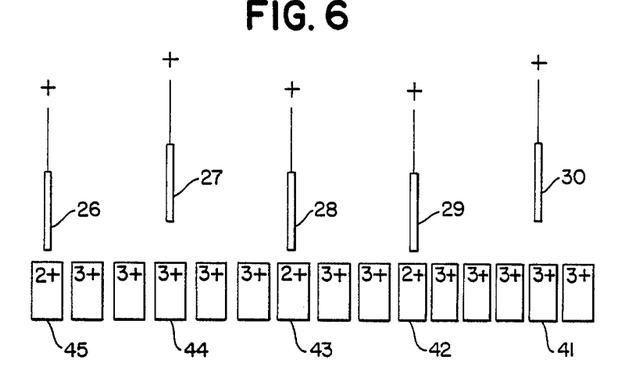

In this embodiment, the apparatus of the embodiment 8 is used and electrically conductive needles are employed as needles 8. In addition, an element which has some valencies is employed as the memory 5. FIG. 6 is an enlarged view of a part of the arrangement including the needles 8 and the memory 5 according to this embodiment. When a voltage is applied to an atom of an element which has some valencies, the number of electrons thereof changes. Electrically conductive needles (26 to 30) are brought close to atoms (41 to 45), respectively, of said element constituting the memory 5 and a voltage is applied thereto, thereby causing a tunnel effect and thus changing the number of electrons of said atoms. The atoms (44 and 41) under the respective needles (27 and 30) which are not brought close thereto have no change in the number of electrons thereof. Then, the needles are moved in the X- or Y-axis direction on the X-Y plane and only the needles which are above the positions that need writing are brought close to the atoms concerned in the same manner as the above, thereby causing a tunnel effect and thus changing the number of electrons of the atoms at said positions. In this way, memory writing on an atomic scale is realized.

Embodiment 13

Figure 7:
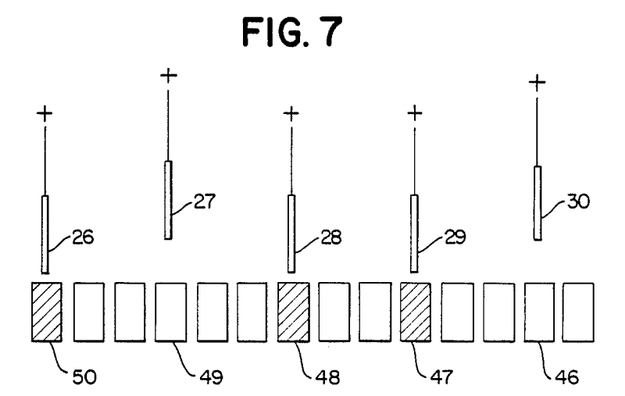

In this embodiment, the apparatus of the embodiment 8 is used and an electro chromic material is employed as the memory 5. FIG. 7 is an enlarged view of a part of the arrangement including the needles 8 and the memory 5 according to this embodiment. When a voltage is applied to a molecule of an electro chromic material, the wavelength of absorbance thereof changes. Needles (26 to 30) are brought close to molecules (46 to 50), respectively, of such a material and a voltage is applied thereto, thereby causing a tunnel effect and thus effecting memory writing. The molecules (49 and 46) under the respective needles (27 and 30) which are not brought close thereto have no change in the wavelength of absorbance. Then, the tips are moved in the X- or Y-axis direction on the X-Y plane and only the needles which are above the positions that need writing are brought close to the memory 5, thereby causing a tunnel effect and thus changing the wavelength of absorbance of the molecules at said positions. In this way, memory writing on a molecular scale is realized.

Embodiment 14

In this embodiment, the apparatus of the embodiment 8 is used and a polar compound immersed in a polar solvent is used as the memory 5. In addition, a multiplicity of electrically conductive needles are employed as the needles 8. The surface of the memory 5 comprising a polar compound immersed in a polar solvent may be considered to be weakly electrified. Electrically conductive needles 8 are brought close to molecules, respectively, of the polar compound and a voltage is applied thereto, thereby causing a tunnel effect and thus effecting memory writing. The polar compound molecules under the respective needles 8 which are not brought close thereto have no change in the amount of electric charge. Then, the needles are moved in the X- or Y-axis direction on the X-Y plane and only the needles which are above the positions that need writing are brought close to the memory 5 in the same manner as the above, thereby causing a tunnel effect and thus realizing memory writing on a molecular scale.

Embodiment 15

In this embodiment, a multiplicity of tips each having a minutely shaped tip portion are employed, and voltages which are applied to these needles are controlled independently of each other to thereby effect memory writing.

Figure 8:
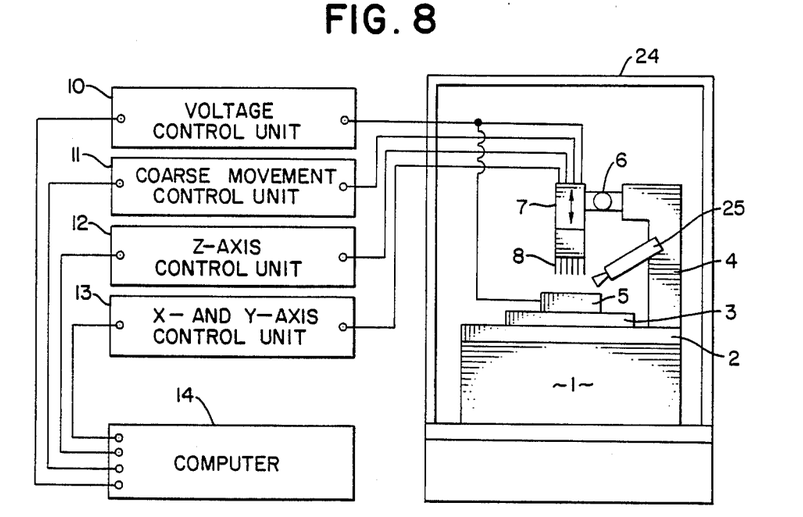
FIG. 8 schematically shows a memory writing apparatus according to the embodiment 15.

FIG. 8 shows a memory writing apparatus according to this embodiment. A needle actuating section 7 is secured to an arm 4 which is rigidly secured to a surface plate 2 mounted on an antivibration mount 1. The needle actuating section 7 can be moved vertically by turning a dial 6 and therefore can be used to effect coarse positioning of the memory 5 and needles 8 in the Z-axis direction. Coarse positioning in the in-plane directions (X-Y axes) is controlled by means of an X-Y stage 3 and a coarse control section 11. An optical microscope 25 can be used in coarse alignment of the needles 8 and the memory 5. Scanning in the in-plane directions is effected by controlling a three-dimensional piezo-electric device incorporated in the needle actuating section 7 by the operation of an X-and Y-axes control section 13. A predetermined voltage within a range of from 1 to 100 mv is applied between the memory 5 and each of the needles 8 to thereby effect writing on the memory 5. The voltages respectively applied to the needles 8 can be controlled independently of each other. The coarse control section 11, Z-axis control section 12, X-and Y-axes control section 13 and voltage control section 10 are controlled by a computer 14. The whole apparatus except for the powersupply, control section 10 to 13 and computer 14 is installed within a shielding box 24.

Embodiment 16

Figure 9:
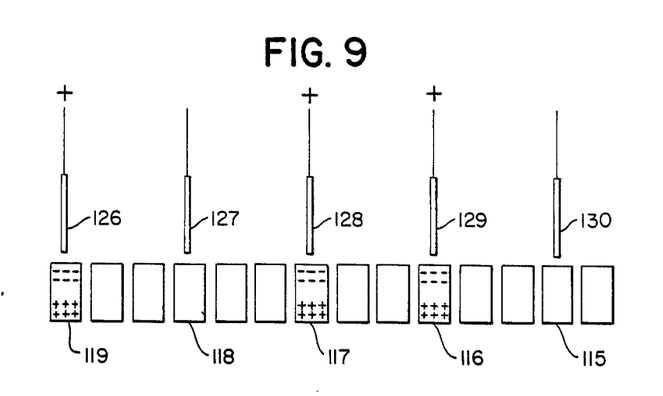
FIGS. 9 to 13 are enlarged views each showing a part of the arrangement including the tips and memory section according to each of the embodiments 16 to 20.

In this embodiment, the apparatus of the embodiment 15 is used and a dielectric is employed as the memory section 5. FIG. 9 is an enlarged view of a part of the arrangement including the needles 8 and the memory 5 according to this embodiment. Needles (126 to 130) are brought close to dielectic atoms (115 to 119) which are present on the surface of the memory 5 to apply a voltage and thereby polarize them. The atoms (118 and 115) under the respective needles (127 and 130) to which no voltage is applied are not polarized. Then, the needles are moved in the X- or Y- axis direction on the X-Y plane and a voltage is applied to only the needles which are above the positions that need writing in the same manner as the above, thereby polarizing only the atoms at said positions. In this way, memory writing on an atomic scale is realized.

Embodiment 17

Figure 10:
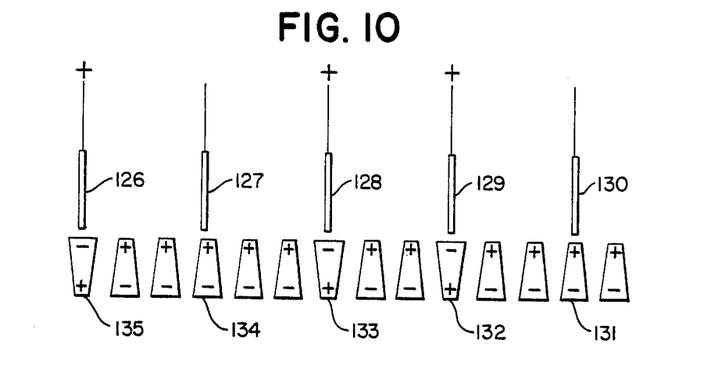

In this embodiment, the apparatus of the embodiment 15 is used and a compound having a polarity is employed as the memory 5. FIG. 10 is an enlarged view of a part of the arrangement including the needles 8 and the memory 5 according to this embodiment. When a voltage is applied to molecules (131 to 135) of the polar compound constituting the memory 5, the molecules rotate along the direction of the electric field. The molecules (134 and 131) under the respective needles (127 and 130) to which no voltage is applied do not rotate. Then, the needles are moved in the X- or Y-axis direction on the X-Y plane and a voltage is applied to only the needles which are above the positions that need writing in the same manner as the above, thereby rotating only the molecules at said positions. In this way, memory writing on a molecular scale is realized.

Embodiment 18

Figure 11:
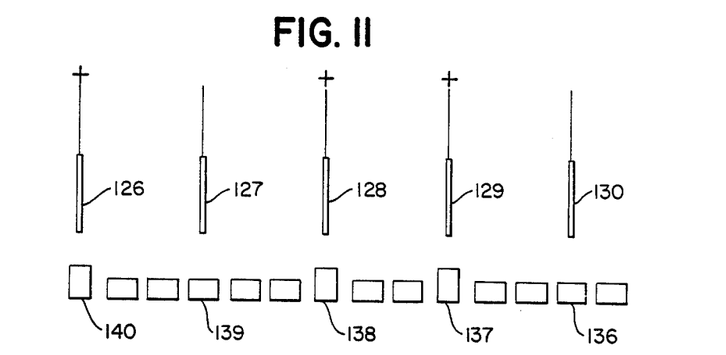

In this embodiment, the apparatus of the embodiment 15 is used and a liquid crystal compound is employed as the memory 5. FIG. 11 is an enlarged view of a part of the arrangement including the needles 8 and the memory 5 according to this embodiment. When a voltage is applied to a liquid crystal, the direction of its molecules changes. Needles (126 to 130) are brought close to molecules (136 to 140), respectively, of the liquid crystal compound constituting the memory 5 and a voltage is applied thereto to thereby change the direction of the liquid crystal molecules. The molecules (139 and 136) under the respective needles (127 and 130) to which no voltage is applied do not change their direction. Then, the needles are moved in the X- or Y-axis direction on the X-Y plane and a voltage is applied to only the needles which are above the positions that need writingin the same manner as the above, thereby changing the direction of only the molecules at said positions. In this way, memory writing on a molecular scale is realized.

Embodiment 19

Figure 12:
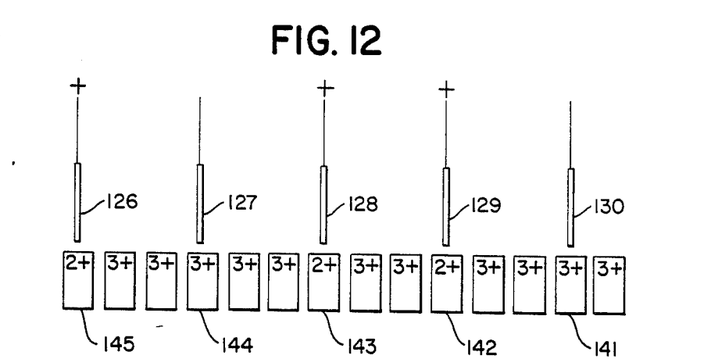

In this embodiment, the apparatus of the embodiment 15 is. used and electrically conductive needles are employed as the needles 8. In addition, an element which has some valencies is employed as the memory 5. FIG. 12 is an enlarged view of a part of the arrangement including the needles 8 and the memory 5 according to this embodiment. When a voltage is applied to an atom of an element which has some valencies, the number of electrons thereof changes. Electrically conductive tips (126 to 130) are brought close to atoms (141 to 145), respectively, of said element constituting the memory 5 and a voltage is applied thereto, thereby causing a tunnel effect and thus changing the number of electrons of said atoms. The atoms (144 and 141) under the respective needles (127 and 130) to which no voltage is applied have no change in the number of electrons thereof. Then, the needles are moved in the X- or Y-axis direction on the X-Y plane and a voltage is applied only the tips which are above the positions that need writing in the same manner as the above, thereby causing a tunnel effect and thus changing the number of electrons of the atoms at said positions In this way, memory writing onan atomic scale is realized.

Embodiment 20

Figure 13:
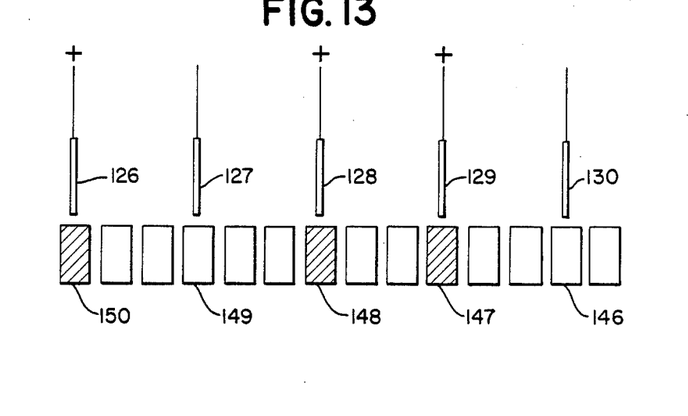

In this embodiment, the apparatus of the embodiment 15 is used and an electro chromic material is employed as the memory 5. FIG. 13 is an enlarged view of a part of the arrangement including the needles 8 and the memory 5 according to this embodiment. When a voltage is applied to a molecule of an electro chromic material, the wavelength of absorbance thereof changes. Needles (126 to 130) are brought close to molecules (146 to 150), respectively, of such a material and a voltage is applied thereto, thereby causing a tunnel effect and thus effecting memory writing. The molecules (149 and 146) under the respective needles (127 and 130) to which no voltage is applied have no change in the wavelength of absorbance. Then, the needles are moved in the X- or Y-axis direction on the X-Y plane and a voltage is applied to only the needles which are above the positions that need writing in the same manner as the above, thereby causing a tunnel effect and thus changing the wavelength of absorbance of the molecules at said positions. In this way, memory writing on a molecular scale is realized.

Embodiment 21

In this embodiment, the apparatus of the embodiment 15 is used and a polar compound immersed in a polar solvent is employed as the memory 5. In addition, a multiplicity of electrically conductive needles are employed as the needles 8. The surface of the memory 5 comprising a polar compound immersed in a polar solvent may be considered to be weakly electrified. Electrically conductive needles 8 are brought close to molecules, respectively, of the polar compound and a voltage is applied thereto, thereby causing a tunnel effect and thus effecting memory writing. The polar compound molecules under the respective needles 8 to which no voltage is applied have no change in the amount of electric charge. Then, the needles are moved in the X- or Y-axis direction on the X-Y plane and a voltage is applied to only the needles which are above the positions that need writing in the same manner as the above, thereby causing a tunnel effect and thus realizing memory writing on a molecular scale.

Embodiment 22

In this embodiment, a needle having a minutely shaped tip portion is manufactured by the use of a semiconductor manufacturing techniques.

Figure 14:
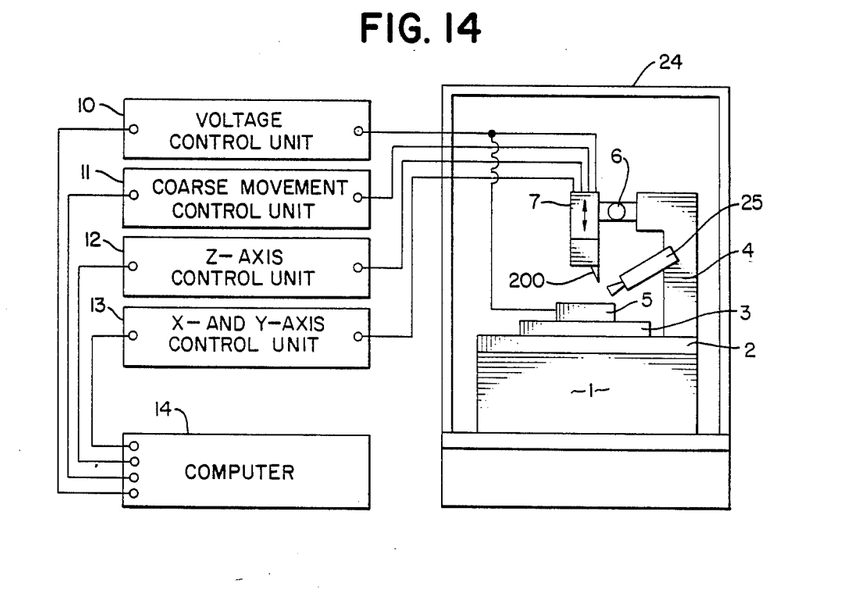
FIG. 14 schematically shows a memory writing apparatus according to the embodiment 22.

FIG. 14 shows a memory writing apparatus according to this embodiment. A needle-shaped device actuating section 7 is secured to an arm 4 which is rigidly secured to a surface plate 2 mounted on an antivibration mount 1. The needle-shaped device actuating section 7 can be moved vertically by turning a dial 6 and therefore can be used to effect coarse positioning of the memory 5 and a needle-shaped device 200 in the Z-axis direction. Coarse positioning in the in-plane directions (X-Y axes) is controlled by means of an X-Y stage 3 and a coarse control section 11. A light microscope 25 can be used in coarse alignment of the needle-shaped device 200 and the memory 5. Scanning in the in-plane directions is effected by controlling a three-dimensional piezo-electric device incorporated in the needle-shaped device actuating section 7 by the operation of an X-and Y- axes control section 13 A predetermined voltage within a range of from 1 to 100 mV is applied between the memory 5 and the needle-shaped device 200 to thereby effect writing on the memory 5. The needle-shaped device 200 comprises a semiconductor substrate having conductive and insulative portions alternately disposed on the plane thereof. An electrically conductive needle whose tip portion comprises one to several atoms is connected to each conductive portion. The conductive needles may be produced by miniaturizing a conductive layer grown on the semiconductor substrate by etching process. Voltages respectively applied to the conductive portions can be controlled independently of each other. The coarse control section 11, Z-axis control section 12, X-and Y-axes control section 13 and voltage control section 10 are controlled by a computer 14. The whole apparatus except for the power supply, the control sections 10 to 13 and the computer 14 is installed within a shielding box 24.

Embodiment 23

Figure 15:
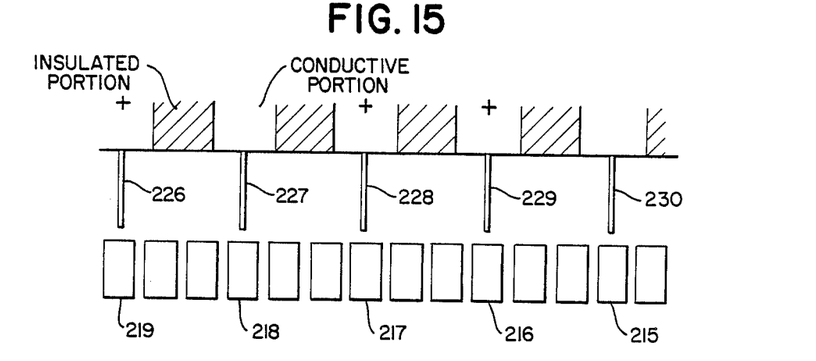
FIGS. 15 to 19 are enlarged views each showing a part of the arrangement including the tip-shaped device and memory section according to each of the embodiments 23 to 27.

In this embodiment, the apparatus of the embodiment 22 is used and a dielectric is employed as the memory section 5. FIG. 15 is an enlarged view of a part of the arrangement including the needle-shaped device 200 and the memory 5 according to this embodiment. Fine conductive needle (226 to 230) connected to the respective conductive portions of the needle-shaped device 200 are brought close to dielectric atoms (215 to 219) which are present on the surface of the memory 5 and a voltage is applied thereto to polarize them. The atoms (218 and 215) under the respective needles (227 and 230) to which no voltage is applied are not polarized. Then, the needle-shaped device 200 is moved in the X- or Y-axis direction on the X-Y plane and a voltage is applied to only the needle which are above the positions that need writing in the same manner as the above, thereby polarizing only the atoms at said positions. In this way, memory writing on an atomic scale is realized.

Embodiment 24

Figure 16:
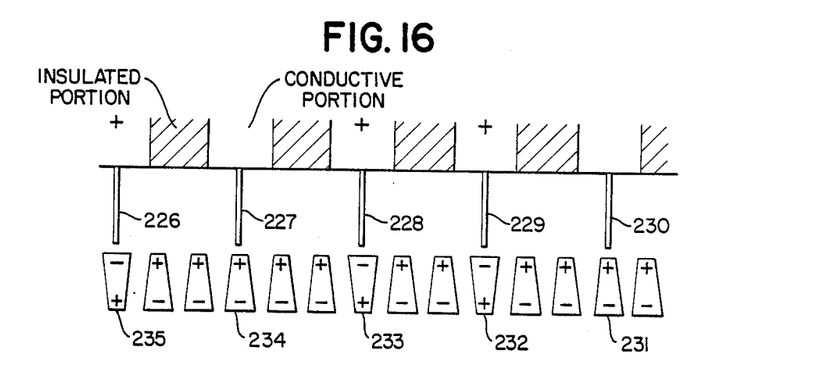

In this embodiment, the apparatus of the embodiment 22 is used and a compound having a polarity is employed as the memory 5. FIG. 16 is an enlarged view of a part of the arrangement including the needle-shaped device 200 and the memory 5 according to this embodiment. When a voltage is applied to molecules (231 to 235) of the polar compound constituting the memory 5, the molecules rotate along the direction of the electric field. Fine needles (226 to 230) respectively connected to the conductive portions of the needle-shaped device 200 are brought close to molecules (231 to 235), respectively, of the polar compound on the surface of the memory 5 and a voltage is applied thereto to rotate these polar compound molecules. The molecules (234 and 231) under the respective needles (227 and 230) to which no voltage is applied do not rotate. Then, the needle-shaped device 200 is moved in the X- or Y-axis direction on the X-Y plane and a voltage is applied to only the needles which are above the positions that need writing in the same manner as the above, thereby rotating only the molecules at said positions. In this way, memory writing on a molecular scale is realized.

Embodiment 25

Figure 17:
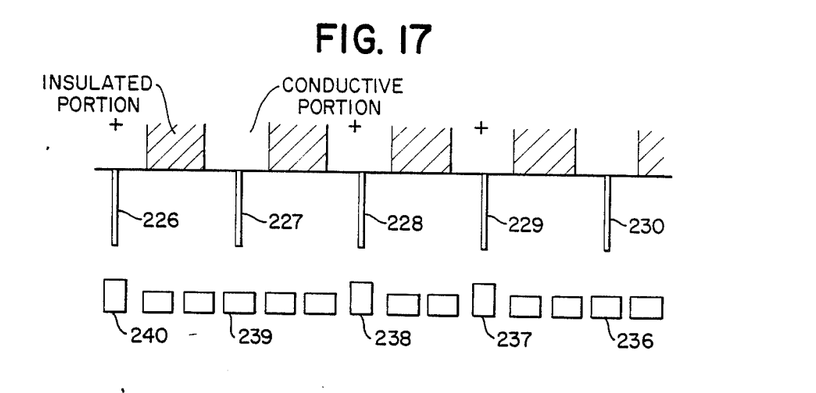

In this embodiment, the apparatus of the embodiment 22 is used and a liquid crystal compound is employed as the memory 5. FIG. 17 is an enlarged view of a part of the arrangement including the needle-shaped device 200 and the memory 5 according to this embodiment. When a voltage is applied to a liquid crystal, the direction of its molecules changes Fine needles (226 to 230) which are respectively connected to the conductive portions of the needle-shaped device 200 are brought close to molecules (236 to 240), respectively, of the liquid crystal compound constituting the memory 5 and a voltage is applied thereto to thereby change the direction of the liquid crystal molecules. The molecules (239 and 236) under the respective needles (227 and 230) to which no voltage is applied do not change their direction. Then, the needle-shaped device 200 is moved in the X- or Y-axis direction on the X-Y plane and a voltage is applied to only the tips which are above the positions that need writing in the same manner as the above, thereby changing the direction of only the molecules at said positions. In this way, memory writing on a molecular scale is realized.

Embodiment 26

Figure 18:
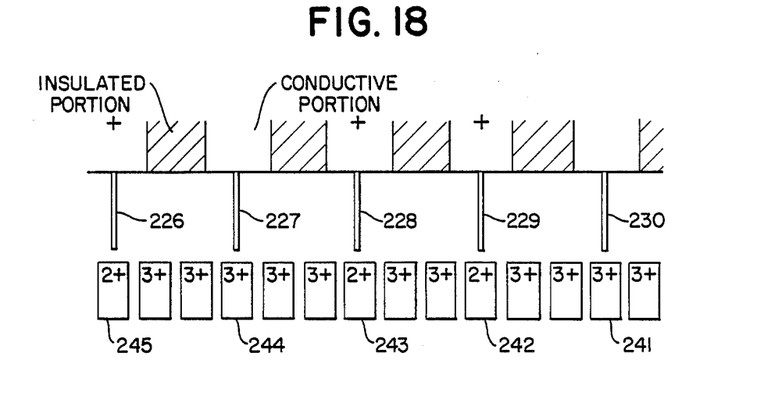

In this embodiment, the apparatus of the embodiment 22 is used and electrically conductive needles are employed as the needles of the needle-shaped device 200. In addition, an element which has some valencies is employed as the memory 5. FIG. 18 is an enlarged view of a part of the arrangement including the needle-shaped device 200 and the memory 5 according to this embodiment. When a voltage is applied to an atom of an element which has some valencies, the number of electrons thereof changes. Fine needles (226 to 230) which are respectively connected to the conductive portion of the needle-shaped device 200 are brought close to atoms (241 to 245), respectively, of said element constituting the memory section 5 and a voltage is applied thereto, thereby causing a tunnel effect and thus changing the number of electrons of said atoms. The atoms (244 and 241) under the respective needles (227 and 230) to which no voltage is applied have no change in the number of electrons thereof. Then, the needle-shaped device 200 is moved in the X- or Y-axis direction on the X-Y plane and a voltage is applied only the needles which are above the positions that need writing in the same manner as the above, thereby causing a tunnel effect and thus changing the number of electrons of the atoms at said positions. In this way, memory writing on an atomic scale is realized.

Embodiment 27

Figure 19:
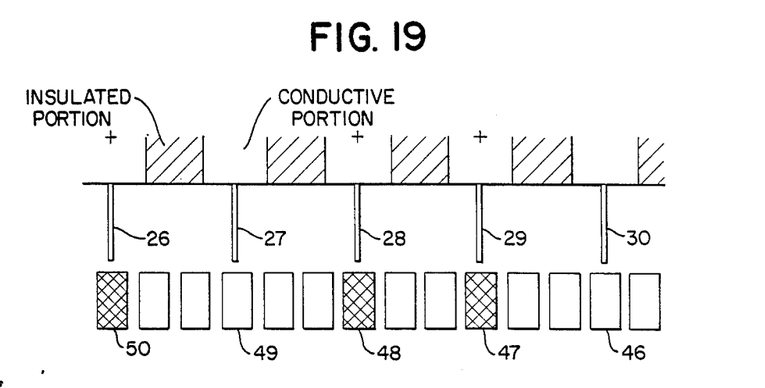

In this embodiment, the apparatus of the embodiment 22 is used and an electro chromic material is employed as the memory section 5. FIG. 19 is an enlarged view of a part of the arrangement including the needle-shaped device 200 and the memory 5 according to this embodiment. When a voltage is applied to a molecule of an electro chromic material, the wavelength of absorbance thereof changes. Fine needles (226 to 230) which are respectively connected to the conductive portions of the needle-shaped device 200 are brought close to molecules (246 to 250), respectively, of such a material and a voltage is applied thereto, thereby causing a tunnel effect and thus effecting memory writing. The molecules (249 and 246) under the respective needles (227 and 230) to which no voltage is applied have no change in the wavelength of absorbance. Then, the needle-shaped device 200 is moved in the X- or Y-axis direction on the X-Y plane and a voltage is applied to only the needles which are above the positions that need writing, thereby causing a tunnel effect and thus changing the wavelength of absorbance of the molecules at said positions. In this way, memory writing on a molecular scale is realized.

Embodiment 28

In this embodiment, the apparatus of the embodiment 22 is used and a polar compound immersed in a polar solvent is employed as the memory 5. In addition, a multiplicity of electrically conductive needles are used as the needles of the needle-shaped device 200. The surface of the memory 5 comprising a polar compound immersed in a polar solvent may be considered to be weakly electrified. Each having a fine and electrically conductive tip portion, which are respectively connected to the conductive portions of the needle-shaped device 200 are brought close to molecules, respectively, of the polar compound and a voltage is applied thereto, thereby causing a tunnel effect and thus effecting memory writing. The polar compound molecules under the respective needles to which no voltage is applied have no change in the amount of electric charge. Then, the needle-shaped device 200 is moved in the X- or Y-axis direction on the X-Y plane and a voltage is applied to only the needles which are above the positions that need writing in the same manner as the above, thereby causing a tunnel effect and thus realizing memory writing on a molecular scale.

As has been described above, the present invention enables realization of non-contact recording on an atomic or molecular scale which has heretofore been difficult to realize by employing a memory writing apparatus which comprises at least one needle having a fine tip portion, means for bringing the end portion of the needle close to the surface of a memory to thereby position the needle, means for allowing the tip portion of the needle to scan the surface of the memory, and means for independently controlling the distance and voltage applied between the tip portion of the needle and the surface of the memory during scanning.

Information may read from memory 5 in the manner described in our concurrently filed application Ser. No. 243,514 entitled "MEMORY READING APPARATUS".

Memory 5 may be made of the following materials, cited by way of example:
Embodiments 2, 9, 16, 23
  DNP (1,6-bis (2,4-dinitrophenoxy)-2,4-hexadiyne.
Embodiments 3, 10, 17, 24
  Vinyledene fluoride.
Embodiments 4, 11, 18, 25
  P-methoxy benzylidene - p-butylaniline.
Embodiments 5, 12, 19, 26
  Copper or iron.
Embodiments 6, 13, 20, 27
  Lu-diphthalocyanine.
Embodiments 7, 14, 21, 28
  Vinylidene fluoride as the polar compound in dimethyl sulfoxide as the polar solvent.

In each case, the active memory material may be in the form of a layer having a thickness of the order of several tens of Angstroms.

The, or each, writing needle may be manufactured by known mechanical polishing or electrolytic etching techniques and preferably has a diameter of the order of 1 to 10 Å. To perform a writing operation, a needle should be brought to a distance of no greater than 10 Å from the memory surface.

What is claimed is:

1. Data writing and storage apparatus comprising:
   a memory having a surface and composed of a material which is located at the surface and which is constituted by individual segments each having an atomic or molecular scale and each capable of individually undergoing a change in physical state in response to an electrical signal;
   an input section for placing each segment into a physical state corresponding to the value of a respective data bit, said input section comprising at least one needle having a fine tip portion dimensioned to apply an electrical signal to an individual memory segment in order to control the physical state of one segment at a time; and
   control means for controlling the input section, said control means comprising means for positioning the tip portion of the needle close to the surface of the memory, means for scanning the tip portion of the needle over the surface of the memory and means for controlling a distance between the tip portion of the needle and each individual segment on the surface of the memory while the tip portion of the needle scans thereover to effect change of the physical state of the individual segments to thereby write a data bit into each segment.

2. Apparatus as claimed in claim 1 wherein the tip portion of the needle is maintained at a selected distance from the surface of the memory so as to cause a tunnel effect effective to change the physical state of a selected segment.

3. Apparatus as claimed in claim 1, wherein the needle is manufactured by using semiconductor processing techniques.

4. Apparatus as claimed in claim 1, wherein a dielectric is used as the memory.

5. Apparatus as claimed in claim 1, wherein a polar compound is used as the memory.

6. Apparatus as claimed in claim 1, wherein a liquid crystal compound is used as the memory.

7. Apparatus as claimed in claim 1, wherein an element which has a changeable valence is used as the memory.

8. Apparatus as claimed in claim 1, wherein an electro chromic material is used as the memory.

9. Apparatus as claimed in claim 1, wherein a polar compound which is immersed in a polar solvent is used as the memory.

10. Apparatus as claimed in claim 1, wherein the positioning means comprises and X-Y stage movable parallel to the memory surface, a coarse control unit for positioning the stage in a plane parallel to the memory surface, and an optical microscope for aiding coarse alignment of the tip portion of the needle relative to the survace of the memory.

11. Apparatus as claimed in claim 1, wherein the distance controlling means comprises a coarse control section and a control section for positioning the needle in a direction perpendicular to the memory surface.

* * * * *